US007630730B2

(12) United States Patent
Becker et al.

(10) Patent No.: US 7,630,730 B2
(45) Date of Patent: Dec. 8, 2009

(54) APPARATUS AND METHOD FOR TIME CONTROL OF THE PROCESSING OF A RADIO SIGNAL IN A MOBILE STATION

(75) Inventors: Burkhard Becker, Ismaning (DE); Thomas Hauser, Munich (DE); Thuyen Le, Munich (DE); Matthias Obermeier, Gernlinden (DE)

(73) Assignee: Infineon Technologies AG, Munich (DE)

( * ) Notice: Subject to any disclaimer, the term of this patent is extended or adjusted under 35 U.S.C. 154(b) by 732 days.

(21) Appl. No.: 10/858,818

(22) Filed: Jun. 2, 2004

(65) Prior Publication Data

US 2005/0008040 A1    Jan. 13, 2005

(30) Foreign Application Priority Data

Jun. 11, 2003   (DE) ............................... 103 26 336

(51) Int. Cl.
*H04B 7/00* (2006.01)
(52) U.S. Cl. .................. 455/522; 455/434; 455/574; 375/369; 375/357; 375/359; 375/362
(58) Field of Classification Search ................ 455/574, 455/434; 375/369, 357, 362
See application file for complete search history.

(56) References Cited

U.S. PATENT DOCUMENTS

| 6,633,753 | B1 * | 10/2003 | Kido ........................ 455/343.2 |
| 6,639,907 | B2 * | 10/2003 | Neufeld et al. .............. 370/342 |
| 6,650,694 | B1 * | 11/2003 | Brown et al. ................. 375/150 |
| 6,768,725 | B2 * | 7/2004 | Wakamatsu ................. 370/311 |
| 6,804,503 | B2 * | 10/2004 | Shohara et al. ........... 455/343.4 |
| 7,023,902 | B2 * | 4/2006 | Sih et al. ..................... 375/147 |
| 7,269,145 | B2 * | 9/2007 | Koo et al. .................... 370/311 |

FOREIGN PATENT DOCUMENTS

EP              1 128 565 A2      8/2001

* cited by examiner

*Primary Examiner*—Lana N Le
*Assistant Examiner*—Ping Hsieh
(74) *Attorney, Agent, or Firm*—Eschweiler & Associates, LLC

(57) ABSTRACT

The apparatus contains a counter that is synchronized to the reference time in the mobile station. The counter counts sampled chips of the radio signal to produce a count. The apparatus further includes a controller that controls the processing of the radio signal, activates the processing of the radio signal when the count matches a begin count, and deactivates the processing of the radio signal when the count matches an end count, wherein the begin count and the end count are determined by a signal processor as a function of the time frame offset of the radio signal with respect to the reference time in the mobile station.

9 Claims, 6 Drawing Sheets

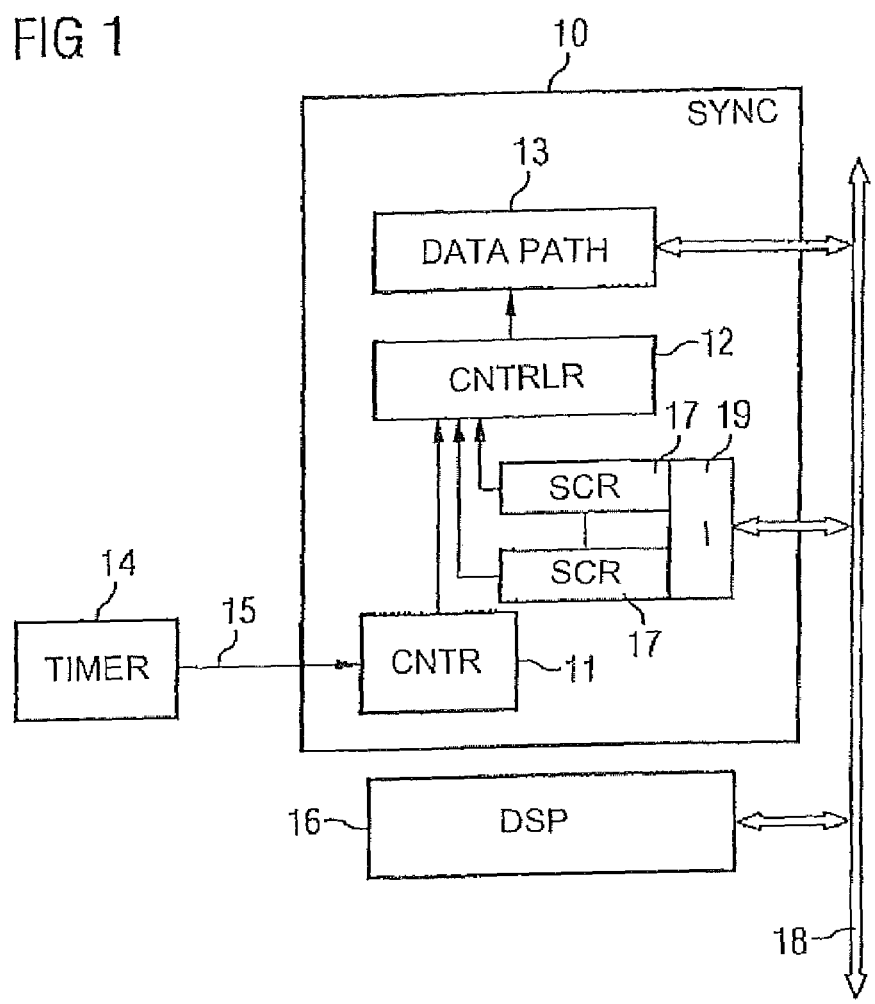

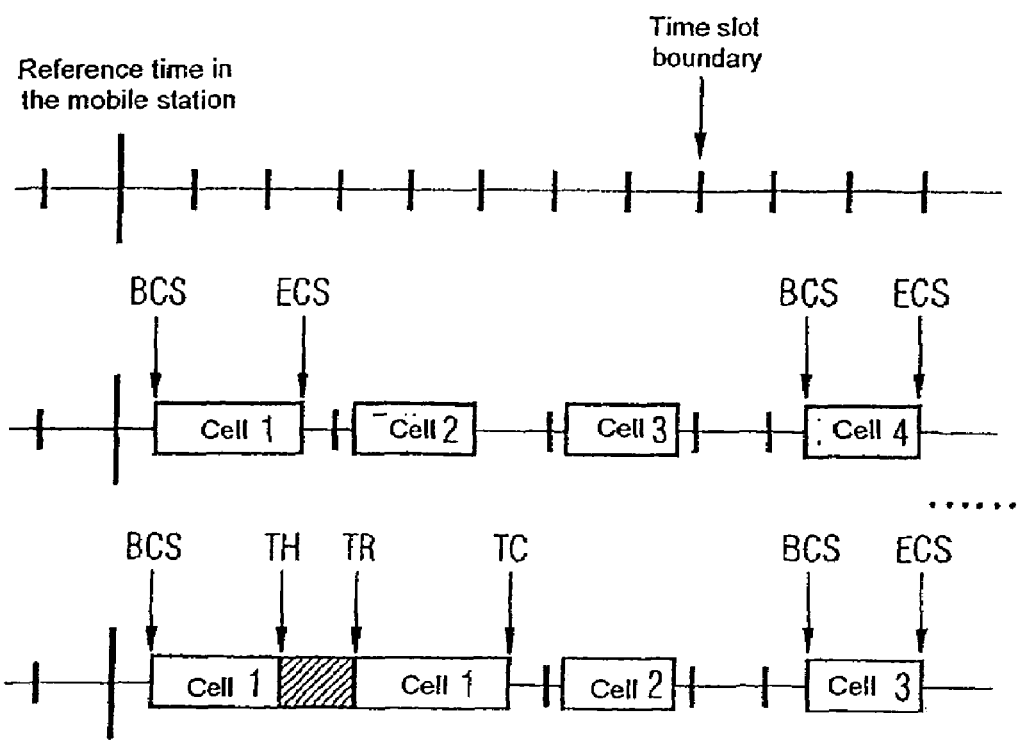
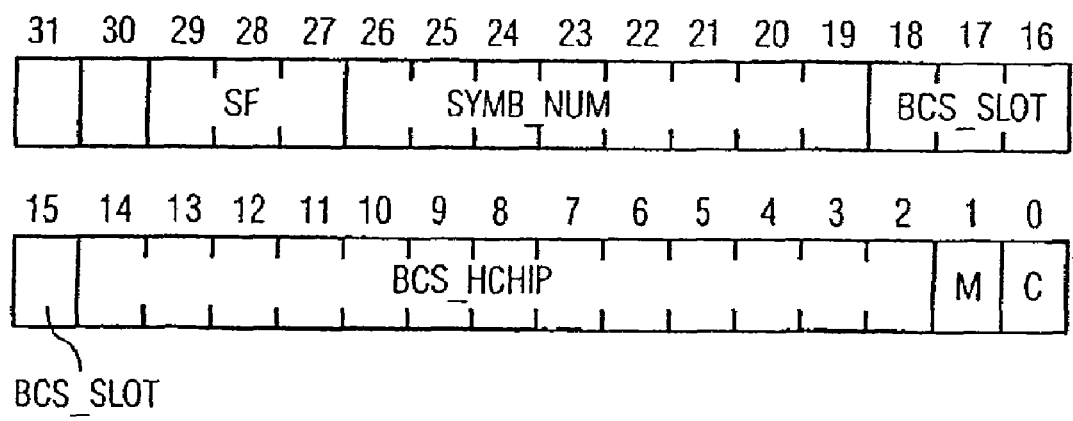

APPARATUS AND METHOD FOR TIME CONTROL OF THE PROCESSING OF A RADIO SIGNAL IN A MOBILE STATION

REFERENCE TO RELATED APPLICATIONS

This application claims the benefit of the priority date of German application DE 103 26 336.5, filed on Jun. 11, 2003, the contents of which are herein incorporated by reference in their entirety.

FIELD OF THE INVENTION

The present invention relates to a synchronization apparatus in a mobile station in a mobile radio system, and in particular to an apparatus and a method for time control of the processing of a radio signal in the synchronization apparatus.

BACKGROUND OF THE INVENTION

One modern example of a mobile radio system is the universal mobile telecommunications system (UMTS). The basic architecture of a UMTS mobile radio system has, inter alia, mobile stations (user equipment (UE)) and a radio access network (UMTS terrestrial radio access network (UTRAN)). The radio access network contains devices for transmission of data by radio, such as base stations, which are referred to as node B in the case of UMTS mobile radio systems. The base stations each supply a specific area or a cell, in which mobile stations may be located. The interface between a mobile station and a base station, whose communication takes place without the use of wires by radio, is referred to as a radio interface (Uu interface).

In a UMTS mobile radio system, digital data to be transmitted is first of all subjected to channel coding. The digital data is thus provided with redundancy and is protected against transmission with errors via a mobile radio channel that is subject to interference, or error correction in each of the receivers of the data is made possible. The digital data is then distributed between physical channels by means of a multiple access method in the time frame of the available transmission bandwidth. Finally, the digital data is digitally modulated, in order to be transmitted via a mobile radio channel.

In the UMTS Standard and in the 3GPP Standard (Third Generation Partnership Project), the code division multiple access method (CDMA) is used as the multiple access method, in which a bipolar data bit stream to be transmitted is spread using a subscriber-specific or channel-specific bipolar spreading code. The elements of the spreading code are referred to as chips, in order to make it possible to semantically distinguish between them and the bits in the data bit stream. In principle, chips are nothing other than bits. The spreading of the data bit stream with the chip stream once again results in a bipolar data stream. In general, the rate of the chip stream is a multiple of the rate of the data bit stream, and is determined by the length of the spreading code, which is indicated by a spreading factor (SF). The spreading factor corresponds to the number of chips per bit. If the chip rate on the radio transmission path between transmitters and receivers is constant, the data bit rate that is represented in the chip stream is dependent only on the spreading factor of the respective subscriber-specific or channel-specific spreading code. Spreading codes with a different spreading factor are used in order to make it possible to use variable data rates. Different data bit streams (channels) that are intended to be transmitted in parallel and originate from one transmitter are spread by means of different orthogonal spreading codes, and are then added.

All subscribers use the multiple access method in order to apply a fingerprint to their payload data by means of a subscriber-specific spreading code, thus allowing the transmitted signal to be reproduced from the sum of the received signals. The sum signal is then also subjected to so-called scrambling, which is carried out by chip-by-chip multiplication of the sum signal by a specific scrambling code that, for example, identifies the base station. The scrambling process in a UMTS mobile radio system makes the entire family of orthogonal spreading codes available to each transmitter which is using its own scrambling code. Two different transmitters may use the same spreading codes, since the different scrambling codes ensure that the signals are quasi-orthogonal on the radio transmission path.

In the receiver, the bits of the data bit stream can be recovered from the received, spread and scrambled chip sequence by repeating the multiplication process. For this purpose, the chip stream is once again multiplied, in the correct phase, by the same complex bipolar scrambling code as has already been used in the transmitter, and is then correlated using the same spreading code, with this once again resulting in the transmitted data bit stream.

The wideband code multiple access method (WCDMA method) has been chosen by the ETSI (European Telecommunications Standard Institute) as the basis for the FDD-UMTS air interface (Uu interface), in which operation in the two transmission directions takes place in different frequency bands. In the WCDMA method, all of the base stations operate independently of one another in terms of the reception time of transmitted channels in the respective mobile stations (UE). Some of the performance features of the WCDMA method include a high degree of service flexibility, in which a large number of transmission modes are offered, in particular with different, including variable, data rates; an asynchronous operation of the base stations, in which the base stations need not be synchronized; and support for an interfrequency cell change or handover, in which a cell change to a different carrier frequency can be carried out for use in hierarchical cell structures or else in hotspots, that is to say in regions where the amount of traffic is very high. Cell changing in the case of CDMA systems is more difficult since transmission takes place all the time and there is therefore no remaining time for cell change measurements. In the case of the WCDMA method, this problem is solved by means of the so-called compressed mode. In this case, there is deliberately no transmission in certain time slots, in order that the mobile station can carry out measurements on other base stations, or else on the GSM network within this phase. Various methods are used in the other time slots in order to ensure that no data is lost as a result of the time slots that are omitted.

In the case of the UMTS mobile radio system, the modulation method used is quaternary phase shift keying (QPSK), in which two successive chips (bits) in a chip sequence to be transmitted are in each case combined to form a chip pair. One chip pair in each case forms a symbol in a symbol space (which is covered by an in-phase path (I) and a quadrature path (Q) for the QPSK modulation) in the complex plane, which has four elements. The quaternary modulation method thus means that two chips are transmitted in each modulation step.

The gross chip rate is thus twice as great as the modulation rate.

In accordance with the UMTS Standard, data is transmitted between the base stations and the mobile stations using a time frame structure, with the multiple access time structure being subdivided into time frames. Each time frame has 15 time slots, which each contain 2560 chips. One time frame has a duration of 10 ms, so that a time slot has a duration of 666 ms, and a chip has a duration of about 0.2604 ms. The chip rate is, for example, 3.84 Mchips/s in the case of WCDMA.

In the case of UMTS mobile radio systems, the time-division duplexing method (TDD) or the frequency-division duplexing method (FDD) may be used in order to separate transmission signals and received signals in a base station or in a mobile station, and in order to separate the uplink from the mobile station to the base station and the downlink from the base station to the mobile station. In the case of the TDD method, the transmission times and reception times change periodically within one frequency band. Within one transmission direction, the multiple access method then splits the available transmission bandwidth between individual subscribers and connections. In the case of the FDD method, the stations each transmit and receive in separate frequency bands.

Information is transmitted on the uplink from the mobile stations via a radio link to the base stations. The information from different mobile stations is coded using the CDMA multiple access method, and is transmitted in physical channels, which are combined to form a radio signal, via a common frequency channel or radio channel to the base stations with which the mobile stations are in radio contact. Information is transmitted from a base station to the mobile stations via a radio link on the downlink. The information of the base station is coded using the CDMA multiple access method, and is transmitted in physical channels to the respective mobile station.

A distinction is generally drawn between so-called dedicated physical channels and common physical channels. A dedicated physical channel is used exclusively by one connection and is reassigned when a connection is set up and, possibly, during the connection. Common physical channels are used simultaneously or alternately by a number of connections. System information that each base station transmits is transmitted, for example, via common physical channels, which every mobile station can receive. Furthermore, there are, for example, common physical channels which are used for packet data transmission. The use of a common physical channel always requires separate addressing of the transmitter and receiver.

The physical channels in the FDD mode are, for example, the dedicated physical channel (DPCH), the common physical control channel (CCPCH), the common pilot channel (CPICH) and the synchronization channel (SCH). The DPCH transmits payload data and control data for a connection by means of dedicated physical channels. This channel exists on the uplink and on the downlink. Distribution services are provided on the downlink by means of the CCPCH. The CCPCH is divided into a primary P-CCPCH and a secondary S-CCPCH sub-channel. The P-CCPCH is used for broadcast transmission of system information within a cell. The S-CCPCH is used, for example, to provide control of the services, and for radio paging. The CPICH is normally the phase reference of the physical channels in the downlink, and is used to assist channel estimation. The CPICH has a primary P-CPICH and a secondary S-CPICH sub-channel. The SCH is a channel on the downlink and is used for cell searching and for synchronization of the mobile stations. It is subdivided into two sub-channels, the primary synchronization channel (P-SCH) and the secondary synchronization channel (S-SCH). The P-SCH is identical for all of the cells, and is thus transmitted without scrambling.

FIG. 5 shows the time control (timing) of the physical channels SCH, CPICH and DPCH in comparison to the physical channel P-CCPCH. Two time frames are shown for the P-CCPCH, each comprising 15 time slots. The P-CCPCH, in which a system time frame number (SFN=System Frame Number) is transmitted is used directly as a time reference for all the physical channels for the downlink, and indirectly for the uplink. The physical channels SCH (primary and secondary), CPICH (primary and secondary) and P-CCPCH have identical time frame time references.

However, the time control for the physical channel DPCH need not be the same as that for other DPCH, and the offset of a DPCH from the start of a P-CCPCH time frame is in each case a multiple of 256 chips, that is to say tDPCH=Tn 256 chip, Tn e [0.1, . . . , 149].

When a mobile station is switched on in UMTS mobile radio systems, it has no information whatsoever about the carrier frequency, the timing and the scrambling code for the transmissions from the surrounding base stations. The mobile station has to synchronize its signal processing apparatuses to received signals which it receives from the surrounding base stations, in order on the one hand to make it possible to correctly decode the data to be received, and in order on the other hand to make it possible to produce and transmit transmission signals, so that it is in turn understood by the base stations. For example, in a transmitter, each time frame is spread using a spreading code, beginning at the start of the time frame, and, of course, this means that time-synchronized despreading (that is to say despreading at the correct time) must also be carried out in a receiver, that is to say the despreading code must be aligned with the start of the received time frame. However, synchronization of the mobile station is necessary not only when the mobile station is switched on, but, furthermore, when a handover takes place to a new cell, or on request from higher protocol layers.

After switching on or after interruption in a connection, or else during operation with no transmission and during active (call) operation, the mobile station carries out a cell search in a UMTS mobile radio system. The cell search after the mobile station has been switched on (initial cell search) is subdivided into the following steps:

determination of the carrier frequency at the base station whose signals are received most strongly, and time slot synchronization with this base station, in order to find time slot boundaries;

time frame synchronization with the most strongly received base station, and identification of a code group of primary scrambling codes; and identification of the primary scrambling code for the most strongly received base station from the code group of the primary scrambling codes.

It should be noted that the carrier frequency is also determined when the mobile station is being operated without transmission, that is to say it is switched on but no mobile radio call is being made, in which case the mobile station then continuously searches for new base stations on the current carrier frequency (intrafrequency cells) and the adjacent carrier frequencies (interfrequency cells). The carrier frequency is likewise determined when the mobile station is actively being operated, in which case the mobile station continuously searches for new base stations, but only on the current carrier frequency.

The primary synchronization channel P-SCH is used for determining the carrier frequency at the base station and for time slot synchronization, and the secondary synchronization channel S-SCH is used for time frame synchronization with the base station and for determining the code group of primary scrambling codes.

The primary synchronization channel P-SCH has a primary synchronization code PSC within a time slot, and the secondary synchronization channel S-SCH has a secondary synchronization code SSC within a time slot. The same primary synchronization codes PSC are always transmitted at the start of a time slot in the primary synchronization channel P-SCH. In contrast, different secondary synchronization codes SSC are transmitted at the start of each time slot in the secondary synchronization channel S-SCH. One time slot on the synchronization channels contains 2560 chips, of which the first 256 chips are used for the primary and secondary synchronization codes PSC and SSC, as is also shown in FIG. 5. The primary and secondary synchronization codes are known in advance by the mobile stations, since they are the same for the entire UMTS mobile radio system.

During the first step of a cell searching process, the mobile station uses the primary synchronization channel P-SCH in order to determine both the carrier frequency and the time slot synchronization of the base station. This is done by means of signal-matched filtering, which is matched to the primary synchronization channel P-SCH, and which measures the power level of the primary synchronization channels P-SCH arriving from different base stations. The received signal is in this case correlated with the primary complex-conjugate synchronization code PSC, in order to find the start of a time slot. The result of the signal-matched filtering has signal peaks for each propagation path of a signal from each of the base stations within range of the mobile station. The start and the time duration of a time slot can be determined from these signal peaks. The timing of the strongest signal peak is recorded, in particular in order to determine the timing of the most strongly received base station, modulo the time slot length. The signal-matched filtering is generally carried out over a number of time slots, in order as far as possible to minimize the error by averaging when determining the time slot boundaries. It should be noted that, in addition to the most strongly received base station, other base stations are identified which, for example, play a role when a handover or cell change takes place.

After the accurate time synchronization to the time slots, the time slot boundaries are known, and synchronization to the time frames takes place in a second step, in order to determine the time frame boundaries. The mobile station can use the secondary synchronization channel S-SCH to synchronize itself to the time frame structure. One time frame on the secondary synchronization channel comprises 15 time slots. The different secondary synchronization codes SSC and time frame synchronization codes are transmitted by the base station, and are received by a mobile station, at the start of each time slot. Each secondary synchronization code SSC comprises 256 chips in a time slot with a total of 2560 chips, and represents a code pattern. There are a total of 16 different secondary synchronization codes. The possible sequences in which the secondary synchronization codes may be transmitted within a time frame are governed by so-called code groups. The definition of the sequence thus allows the mobile station to determine not only the code group associated with a cell, but also the time frame boundaries. The received signal is for this purpose correlated with all the possible secondary synchronization codes, at the positions of the secondary synchronization codes SSC, which are known after the time slot synchronization. The correlation processes are used to derive decision variables, which are used to determine the code group for that cell. If, for example, a mobile station receives a sequence of 3 secondary synchronization codes in 3 time slots, then the mobile station can immediately determine what code group this is and where the time frame boundaries are located. Each code group comprises 8, and only 8, primary scrambling codes. There are 64 code groups, and thus 512 primary scrambling codes, for the downlink. Each primary scrambling code is associated with a set of scrambling codes. 512 sets of scrambling codes (downlink scrambling codes) are thus defined for the downlink. Even a sequence of 3 secondary synchronization codes in theory allows allocation to a code group, provided that no signal noise is present. Normally, however, secondary synchronization codes are evaluated from all of the available time slots. The time frame synchronization process is carried out either over the length of a time frame or over two or more time frame lengths. The results of the time frame synchronization process can thus be averaged.

Once the code group has been determined, the mobile station knows that the primary scrambling code for the base station is one of the 8 primary scrambling codes that the detected code group has. The common pilot channel CPICH, which is coded using the primary scrambling code, is now evaluated by means of a correlator in the mobile station. The correlator correlates the 8 possible primary scrambling codes in the code group with the pilot channel, and uses any correlation peak that may occur to identify the correct primary scrambling code. The primary scrambling code and the associated set of scrambling codes for the downlink are thus determined.

During operation of a mobile radio system, the mobile radio channel is characterized by multipath propagation (reflection, diffraction, refraction etc.) of the transmitted signals, time dispersion and Doppler distortion. A radio signal which is transmitted from a transmitter can reach a receiver on a number of different propagation paths, which change continuously, and which differ from one another by having different delay times, phase angles and intensities. In a time-variant multipath channel such as this, the channel impulse response must be estimated for each multipath component, in order to calculate its correct phase angle and intensity. However, the multipath propagation is not estimated until the process of recording the synchronization channel in the mobile station has been completed. During the estimation of the channel impulse response, the multipath components must be determined continuously, and the following measures must be carried out continuously:

identification of significant multipath components and of their associated path delays (delay times); and estimation of the associated complex phase angle and intensity of significant multipath components.

Significant multipath components are normally identified by power delay profile estimation, which is carried out using the pilot channels P-CPICH or S-CPICH or dedicated pilot signals that are transmitted in the DPCH. In the case of multipath propagation, a power delay profile contains the mean received signal power as a function of the relative delay time. The power delay profile has a number of peaks, and the path selection is carried out in a known manner by searching the calculated power delay profiles for a specific number of strongest peaks.

In UMTS mobile radio systems, the base stations (node B) each supply one or more cells, in which mobile stations may be located. The base stations process received radio signals from the mobile stations that are located in their cells, and the mobile stations process radio signals from the surrounding base stations. This processing includes, inter alia, error correction via the channel coding, spreading and despreading based on the CDMA multiple access method, and modulation and demodulation based on the QPSK modulation method. The base stations and the mobile stations in the UMTS mobile radio system for this purpose each have dedicated data processing devices and at least one central data processing device. The dedicated data processing devices are connected to one another and to the central data processing device such that they can interchange data.

The central data processing device in the case of the base stations and the mobile stations in the UMTS mobile radio system is, for example, a digital signal processor (DSP) or a microprocessor, in order to carry out communication protocol functions which are difficult to calculate. The central data processing device programs the dedicated data processing devices to carry out specific defined functions with the aid of internal locally available registers or memories, such as direct access memories (RAM=Random Access Memory), which are provided for the storage of parameters. If the central data processing device also itself carries out signal processing tasks or else only initiates signal processing tasks in different dedicated data processing devices, data blocks relating to the parameters must also be transmitted between the central data processing device, or the internal memories of the central data processing device, and the dedicated data processing devices. This is normally done by using the digital signal processor, a controller or a direct memory access (DMA) data transmission device, which transmits data via DMA data channels.

The dedicated data processing devices in the case of the UMTS mobile radio system, by way of example, have a RAKE receiver, a synchronization apparatus, a channel decoder and a transmission module.

The RAKE receiver in the mobile station or in the base station is used to reproduce a transmission signal from a received signal that is formed from a superimposition of signals which have been transmitted on the various propagation paths. The RAKE receiver has fingers like a rake, which are each associated with one propagation path of a signal and are operated with a sampling delay that compensates for the delay time on the corresponding propagation path. Each finger has a demodulator and a correlator, which multiplies the time-delayed received signal for one multipath component by a spreading code, in order to reproduce bits from the received signal, which has been spread at the transmitter end using the same spreading code. The output signals from the individual fingers are combined in order to collect the energy for each symbol not only via a direct path, which may possibly exist, but also from a large number of indirect paths, thus improving the communication reliability.

The synchronization apparatus is used
generally to record and monitor intrafrequency cells and interfrequency cells;
to search for carrier frequencies and time slot boundaries of the individual mobile stations and to carry out time slot synchronization with the individual mobile stations with the aid of the P-SCH;
to search for time frame boundaries of the individual mobile stations, and to carry out time frame synchronization with the individual mobile stations with the aid of the S☐SCH;
to identify the scrambling code of the individual mobile stations with the aid of the S☐SCH and, for example, of the CPICH; and
to search for multipath components and to identify them, and to estimate the power delay profile with the aid of the CPICH or of the DPCH, in order to determine the amplitude and the time delay of the propagation paths, and the channel impulse response.

The demodulators are assigned (finger placement) within the RAKE receiver on the basis of the estimated power delay profile. The synchronization apparatus for this purpose estimates the power delay profile of the received signal, in order to identify the propagation paths of signals from the base stations, and in order to record changes in the propagation conditions and to maintain the time slot and time frame synchronization for the RAKE receiver.

All the tasks of the synchronization apparatus are associated with the correlation of the received chip sequence with the corresponding known chip sequences of the P/S-SCH, P/S-CPICH or DPCH. The correlation must be aligned with the time profile of the physical channels that are received, for example, by a mobile station.

FIG. 6 shows the unaligned arrival of physical channels from two different cells at a mobile station. The mobile station has a reference time and a time frame structure that is defined by time frame boundaries. The time frame boundaries and time frames of the physical channels CPICH/SCH and DPCH1/2 for a cell 1 are offset with respect to the time frame boundaries of the mobile station. This is also referred to as a time frame offset with respect to the reference time of the mobile station. As has already been shown in FIG. 5, the time control (timing) of the physical channels DPCH1/2 differs from the time control of the channels CPICH/SCH, which are aligned with the physical channel P-CCPCH. The time frame boundaries of the physical channels CPICH/SCH and DPCH1 for a cell 2 are likewise offset with respect to the time frame boundaries of the mobile station.

FIG. 7 shows a conventional arrangement for time control of the synchronization apparatus for a mobile station with physical channels for various base stations. The arrangement has a digital signal processor (DSP) 1, a synchronization apparatus 2 and a UMTS timer 3. The UMTS timer 3 has chip counters 4, count registers 5 and comparison devices 6. The UMTS timer 3 is used to produce a first synchronization signal 7 for each base station from which the mobile station receives signals, which first synchronization signal 7 indicates the start of a time slot, and a second synchronization signal 8, which indicates the start of a time frame. The synchronization signals 7 and 8 are produced using a comparison device 6, which compares the current count of a chip counter 4 with a count in a count register 5.

The synchronization apparatus 2 is connected to the UMTS timer 3, and receives the synchronization signals 7 and 8. The synchronization apparatus 2 likewise has counters 9, which count the start of the time slots and time frames as indicated by the synchronization signals 7, 8, in order to control the time and the processing of tasks of the synchronization apparatus 2, such as power delay profile estimation. The DSP 1 is connected to the UMTS timer 3 and to the synchronization apparatus 2. The DSP 1 initialises the chip counter 4 in the UMTS timer 3, programs the counts in the count registers 5, and controls and programs the synchronization apparatus 2 in order to carry out, for example, the power delay profile estimation. The DSP 1 receives from the synchronization apparatus 2 information about the time slot boundaries and time frame boundaries, with the DSP 1 initialising the chip counters 4, and programming the counter registers 5, as a function of this information. The time slot boundaries and the time frame boundaries are determined by the synchronization apparatus 2, as described above, for each of the base stations by means of correlation.

According to the UMTS Standard, a mobile station has to monitor up to 32 intrafrequency cells and 32 interfrequency cells. Since there is no point in implementing the UMTS timer 3 with 64 chip counters 4 in order to cover the worst case, only a small number of chip counters are normally used in order to guarantee operation of the mobile station without any significant time losses caused by the initialisation of the UMTS timer. The chip counters 4 are always initialised or reset by the DSP 1 whenever synchronization signals for a specific cell are required for signal processing.

One disadvantage of the arrangement shown in FIG. 7 is that the DSP 1 has to reprogram the UMTS timer 3, that is to say the chip counters 4 and the count registers 5, as a function of the cell under consideration and of the task of the synchronization apparatus 2 on each occasion, in order to produce the desired synchronization signals 7 and 8, since each cell has its own time control (timing). The DSP 1 also has to program the synchronization apparatus 2 for a specific task.

A further disadvantage of the arrangement shown in FIG. 7 is that the DSP 1 cannot reprogram a specific chip counter 4 until the tasks of the synchronization apparatus 2 have been completed. If the hardware resources in the UMTS timer 3 are limited, the number of tasks that the UMTS timer 3 can control is thus restricted.

A further disadvantage of the arrangement shown in FIG. 7 is that the synchronization is also only chip-based or time-frame-based. Synchronization within a time slot element is not possible without additional hardware complexity.

SUMMARY OF THE INVENTION

The object of the present invention is to provide an apparatus and a method for time control of the processing of a radio signal in a mobile station in a mobile radio system, which allow simple and flexible processing, with high time resolution, of a radio signal.

The idea on which the present invention is based is to use only one counter in the synchronization apparatus, instead of counters in the UMTS timer which are used for signalling the start of each time slot and the start of each time frame in a physical channel at a base station, and counters in the synchronization apparatus, which are used to count the starts of the time slots and the starts of the time frames. The count of the single counter is compared with count stamps, which define the start and the end of a task to be processed, with respect to a reference time in the mobile station.

The invention provides an apparatus for time control of the processing of a radio signal in a mobile station in a mobile radio system, which has base stations and mobile stations, with the radio signal being transmitted from a base station, being subdivided into time frames with a predetermined number of chips, and having a specific time frame offset with respect to a reference time in the mobile station. The apparatus comprises a counter for counting chips in the radio signal and for producing a count, with the counter being synchronized to the reference time in the mobile station; and a controller for controlling the processing of the radio signal, which activates the processing of the radio signal when the count matches a begin count, and deactivates the processing of the radio signal when the count matches an end count. In accordance with one aspect of the invention, with the begin count and the end count are determined as a function of the time frame offset of the radio signal with respect to the reference time in the mobile station.

The invention also provides a synchronization apparatus for a mobile station, which uses the apparatus for time control of the processing of a radio signal in a mobile station.

The invention furthermore provides a method for time control of the processing of a radio signal in a mobile station in a mobile radio system, which has base stations and mobile stations. In the method, the radio signal is transmitted by a base station, and subdivided into time frames with a predetermined number of chips, and has a specific time frame offset with respect to a reference time in the mobile station. The method comprises counting chips in the radio signal, synchronized to the reference time in the mobile station, to produce a count. The method further comprises determining a begin count and an end count as a function of the time frame offset of the radio signal with respect to the reference time in the mobile station. The processing of the radio signal is then controlled, such that the processing of the radio signal is activated when the count matches the begin count, and the processing of the radio signal is deactivated when the count matches the end count.

According to one preferred development of the apparatus, the end count is defined by a parameter which indicates the number of chips which are used for processing the radio signal, starting from the begin count.

According to a further preferred development, the processing of the radio signal is controlled by a further parameter, which in each case controls a start, a hold, a resumption and a termination of the processing of the radio signal.

According to a further preferred development, the apparatus has at least one register or one memory for storage of the begin count, of the end count and of the parameters.

According to a further preferred development, in order to count chips in the radio signal, the counter has a first counter for counting chips within a time slot, and has a second counter for counting time slots within a time frame.

According to a further preferred development, the begin count and/or the end count respectively define a specific time slot in a time frame, and a chip in the specific time slot.

According to a further preferred development, the first counter has an over-sampling factor.

According to a further preferred development, the first counter is a modulo-5120 counter, and the second counter is a modulo-15 counter.

According to a further preferred development, a digital signal processor in the mobile station calculates the begin count, the end count and the parameters as a function of the time frame offset of the radio signal with respect to the reference time.

According to a further preferred development, a timer in the mobile station produces the reference time for the mobile station.

According to a further preferred development, a begin count and an end count are defined for each base station.

According to a further preferred development, the apparatus has a device for processing the radio signal.

One advantage of the present invention is that a synchronization apparatus task can be started at any desired chip position. The DSP just has to program a begin count stamp, which takes account of the offset between the desired time control of the task and a reference time in the mobile station.

A further advantage of the present invention is that the processing of tasks can be interrupted and resumed again at any desired time and at any specific chip position, thus providing a high degree of flexibility.

A further advantage of the present invention is that the time control of a task need not be chip-based, but can be specified with an available chip resolution (for example twice the chip rate), corresponding to the over-sampling factor of the first counter.

A further advantage of the present invention is that tasks can be programmed at the same time without having to block counters for the UMTS timer, as is the case with known solutions. This likewise allows more flexibility for the invention, since every apparatus to be newly added can, according to the preferred development of the present invention, be controlled in time without having to consume further resources of the UMTS timer.

A further advantage of the present invention is that the programming of tasks is not time-critical, since the DSP can carry out the programming sufficiently before the start of a task. This is impossible, for example, in the case of the known solution, since the DSP consumes the chip counter resources of the UMTS timer when it reserves the chip counter a long time in advance, before the synchronization apparatus actually requires the synchronization signals.

A further advantage of the present invention is that the communication between a UMTS timer and a synchronization apparatus is simplified, since the UMTS timer in the mobile station just has to signal a reference time.

A further advantage of the present invention is that the programming of the digital signal processor DSP is simplified, since only the synchronization apparatus is supplied with the parameters for a task or tasks, and no task-related parameters need additionally be programmed in the UMTS timer.

A further advantage of the present invention is that the number of tasks that can be processed is restricted only by the capabilities of the synchronization apparatus and not by the UMTS timer, thus providing programming transparency.

BRIEF DESCRIPTION OF THE DRAWINGS

Preferred exemplary embodiments of the present invention will be explained in more detail in the following text with reference to the attached drawings, in which:

FIG. 1 shows one exemplary embodiment of a synchronization apparatus according to the present invention;

FIG. 2 shows the time control for power delay profile estimation;

FIG. 3 shows one exemplary embodiment of a sequence control register for the synchronization apparatus;

DETAILED DESCRIPTION OF THE INVENTION

Figure 4:
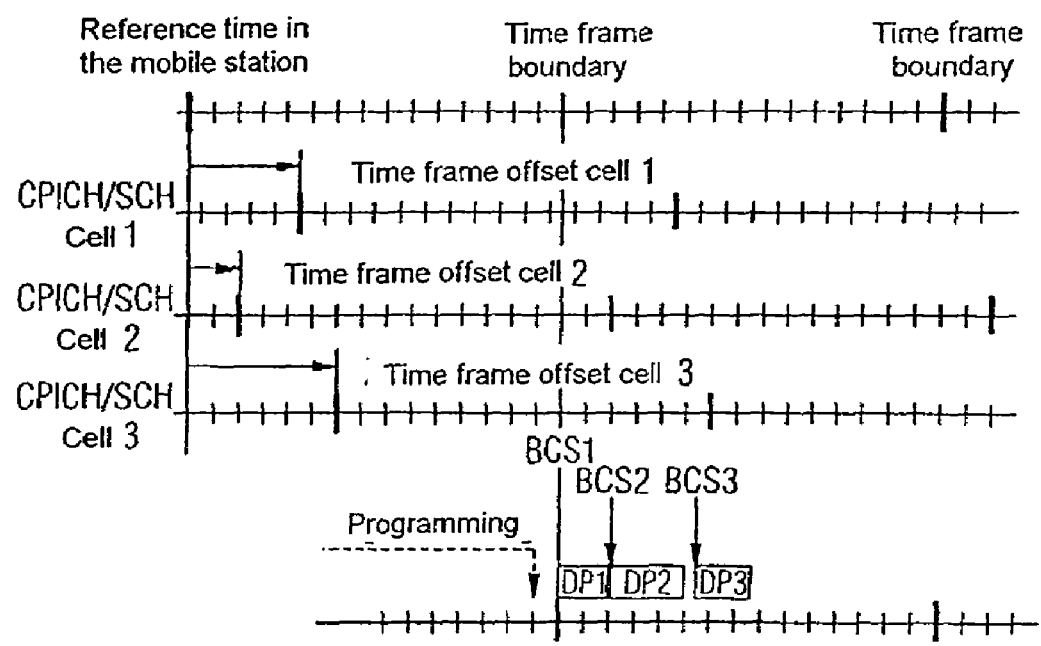
FIG. 4 shows the time control of the power delay profile estimation for cells with a different time frame offset with respect to the reference time in a mobile station.
Figure 5:
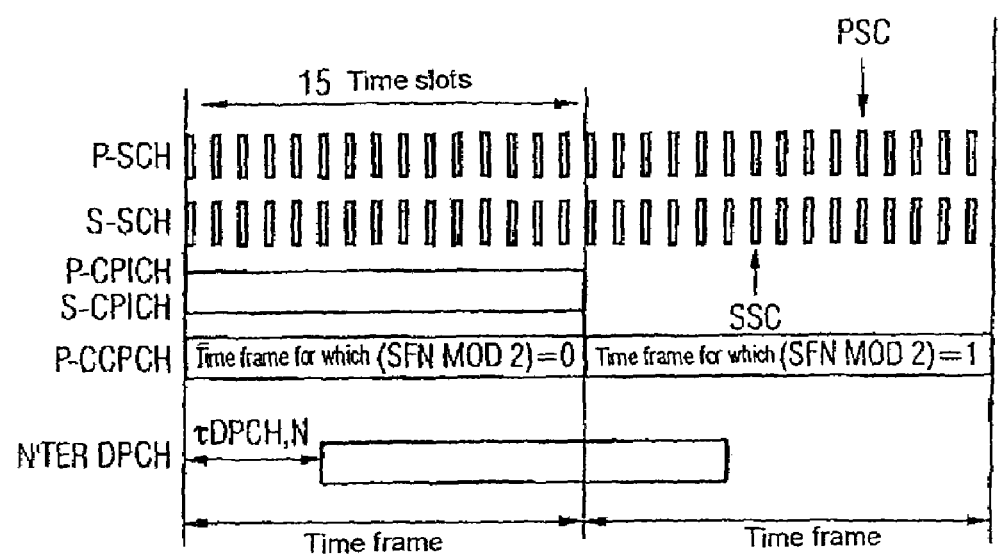
FIG. 5 shows the time control of known physical channels.
Figure 6:
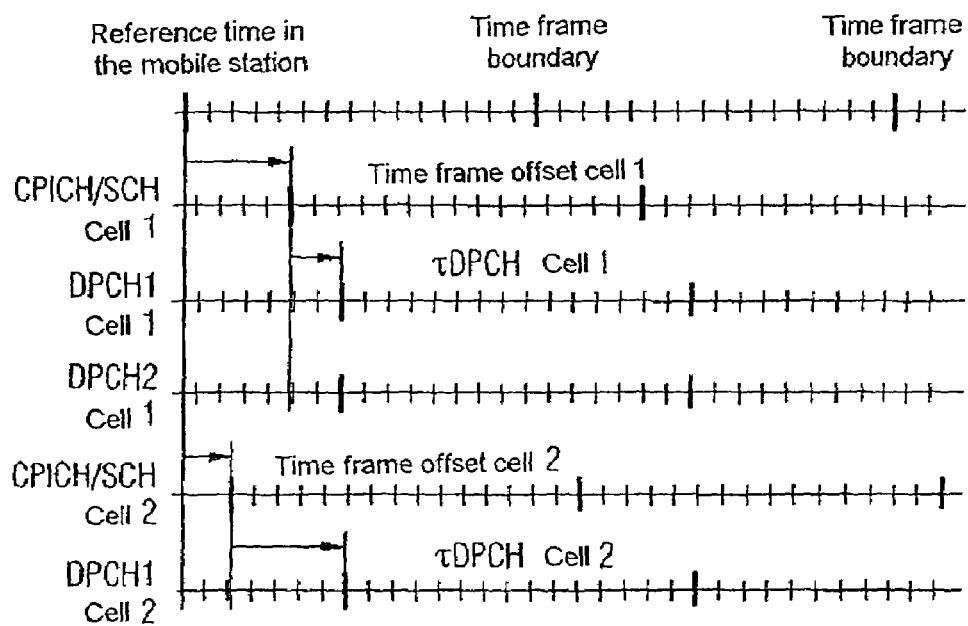
FIG. 6 shows the unaligned arrival of physical channels from two different cells at a mobile station.
Figure 7:
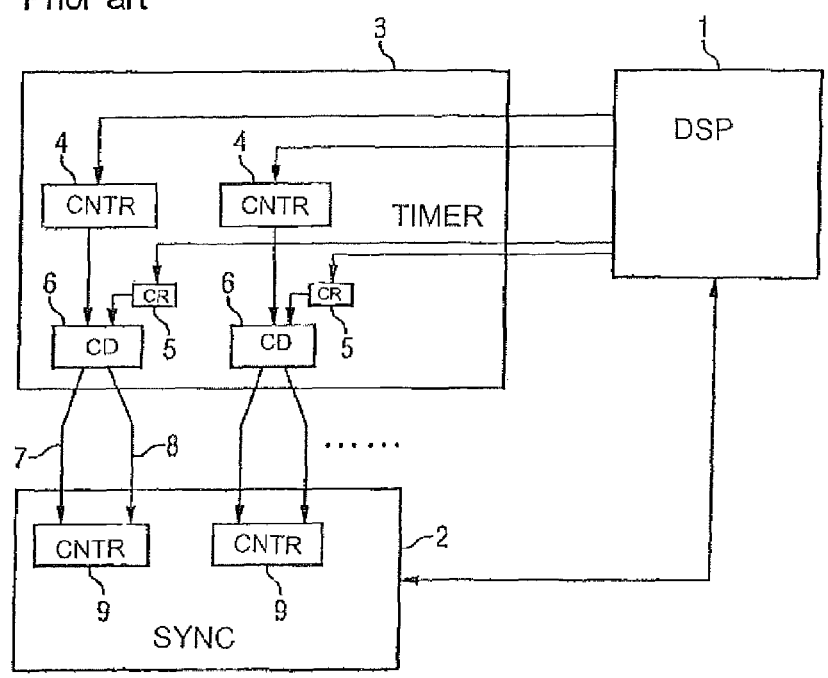
FIG. 7 shows a known arrangement for synchronization of the synchronization apparatus in a mobile station with physical channels from various base stations.

FIG. 1 shows one exemplary embodiment of a synchronization apparatus in a mobile station according to the present invention. The synchronization apparatus 10 has a counter 11 for counting chips, and has a task sequence controller 12, which is connected to the counter 11 and to a data path 13. An external timer 14 is connected to the counter 11 in the synchronization apparatus 10.

The timer 14 is used to supply a reference time for the mobile station. The counter 11 is reset by the timer 14 via a signal 15, and is thus set to the reference time in the mobile station, which is used both by the timer 14 and by a digital signal processor (DSP) 16 in the mobile station. Each chip of a physical channel that is sampled by the mobile station is signalled by a signal from the synchronization apparatus 10 (not shown). The synchronization apparatus 10 increments the counter 11 by 1 whenever a sampled chip arrives. The counter 11 thus allocates a count to each arriving chip. The over-sampling factor is taken into account appropriately in this case.

In the case of a task which must be carried out by the synchronization apparatus 10, for example a power delay profile estimation, which must be carried out in synchronism with the time control of any given cell in an active set of cells or in a monitor set of cells, the task is assigned a begin count stamp (BCS) and an end count stamp (ECS), which are calculated based on the relative offset between the time control for the cell and the time frame offset of the cell with respect to the reference time of the mobile station. The task sequence controller 12 is used to start the task of the synchronization apparatus 10 exactly when a chip which is associated with the begin count stamp arrives, that is to say to start it when the count of the counter 11 is equal to the begin count stamp. The task sequence controller 12 is also used to end the task when the count of the counter 11 reaches the end count stamp. The end count stamp ECS may alternatively be replaced by a parameter which indicates the task duration in chips as used for that task, starting from the begin count stamp BCS.

The data path 13 is used to carry out the processing of the data and received radio signals required for the tasks. Since the synchronization apparatus 10 is used to carry out the tasks relating to time slot synchronization, time frame synchronization and for searching for multipath components, such processing relates to the demodulation, correlation, etc. of signals. The synchronization apparatus 10 thus has devices for demodulation, correlation, etc. in the data path 13. When the counter 11 reaches a begin count stamp BCS for a task, then the task sequence controller 12 controls and activates the data path 13 such that the processing of the task is started.

The synchronization apparatus 10 furthermore preferably has at least one sequence control register 17 for storage of the begin count stamp and of the end count stamp, connected to the task sequence controller 12. The count stamps may alternatively be stored in another memory, for example a direct access memory (RAM). The begin count stamp and the end count stamp are preferably calculated by the digital signal processor (DSP) 16 in the mobile station, which is connected via a bus 18 and an interface 19 to the at least one sequence control register 17, and which stores the begin count stamp BCS and the end count stamp ECS in the respective sequence control register 17. The BCS must be set with respect to the reference time for the mobile station. The DSP 16 calculates the correct BCS for a task on the basis of the time frame offset of the cell that is intended to be processed. The time frame offset of a cell is determined by the data path 13 during a synchronization task of the synchronization apparatus 10, during which the time slot synchronization and the time frame synchronization are determined, and are passed via the bus 18 to the DSP 16. The digital signal processor DSP 16 programs the sequence control register 17 via the bus 18 and the interface 19, either directly or transmits the parameters for the sequence control registers via DMA channels using a DMA data transmission device.

The synchronization apparatus 10 preferably has a number of sequence control registers 17, in which a number of begin count stamps and end count stamps can be stored, which are associated with a number of tasks of the synchronization apparatus 10 for different base stations. The count stamps are preferably programmed at the same time by the DSP 16. The number of tasks that can be processed by the synchronization apparatus 10 depends on the resources of the synchronization apparatus 10.

The counter 11 preferably has two counters, with the first counter counting the number of chips within a time slot with 2560 chips, and the second counter counting the number of time slots within a time frame with 15 time slots. The bit length of the first counter depends on the over-sampling factor of the arriving chips. The first counter preferably has an over-sampling factor of at least 2, and is thus a modulo-5120 counter, that is to say a counter that counts from 0 to 5119, and then starts at zero again. The second counter is a modulo-15 counter.

In a second exemplary embodiment of a synchronization apparatus according to the present invention, one task of the synchronization apparatus (whose end count stamp ECS is not yet known at the time of programming) is to assign just one begin count stamp BCS, which is preferably calculated and programmed by the DSP 16 on the basis of the relative offset between the time control for the cell and the time frame offset of the cell, with respect to the reference time for the mobile station. Whenever the count of the counter 11 is equal to the begin count stamp, the task is started by the task sequence controller 12 exactly when the chip which is associated with this begin count stamp arrives.

In this exemplary embodiment, one task is associated with a parameter which is preferably implemented by bits for coding or specification of task modes, which define and control a task start (TS), a task hold (TH), a task resumption (TR), and a task cancel (TC). Each sequence control register 17 preferably has an additional bit field, which is programmed by the DSP 16, for these bits.

The contents of the additional bit field and the task modes relate to the begin count stamp BCS. The bit field is set by the DSP 16 to TS for the start of each task. TS defines the validity of BCS, and enables the processing. When it is intended to stop an ongoing task at a specific count, the DSP 16 reprograms the bit field, and sets it to TH. The task can be resumed when the bit field is set to TR, or can be ended completely when the bit field is set to TC.

FIG. 2 shows the time control for tasks for power delay profile estimation for the first and second exemplary embodiments of the synchronization apparatus. The upper time axis shows the reference time and time slot structure for a mobile station. On the central time axis, as in the case of the first exemplary embodiment, the tasks for different cells 1, 2, 3 and 4 are controlled in terms of timing in serial form and independently of one another by means of a respectively associated begin count stamp BCS and end count stamp ECS, which are programmed into a sequence control register by the DSP, preferably before the reference time for the mobile station. On the lower time axis, in contrast and as in the case of the second exemplary embodiment, a task that is associated with the cell 1 is placed on hold by setting the bit field of the associated sequence control register to TH (task hold). The task will be resumed later at a specific count by setting the bit field to TR (task resume). The gap between the task hold TH and the task resume TR is, for example, the gap in a compressed mode, in which tasks such as power delay profile estimation which are associated with other base stations are carried out. The task is finally cancelled or ended by setting the bit field to TC (task cancel). The tasks relating to the cells 2 and 3 are once again controlled in time by associated begin count stamps BCS and end count stamps ECS.

The assignment of the begin count stamp and of the end count stamp, and the setting of the bit field to the task start TS in order to start the task are absolutely essential in the case of the second exemplary embodiment, while the setting of the bit field to the task hold TH, the task resume TR and the task cancel TC are optional. There is therefore no need to implement all of the task modes in the additional bit field of the sequence control register depending on the specific requirements. The count stamps are specified on the basis of the desired position of the time control and the time frame offset in comparison to the reference time for the mobile station. This allows the definition of the start of a task with single-chip position accuracy, with the accuracy depending only on the resolution of the counter in the synchronization apparatus, and leads to simplified communication for the synchronization signals between the timer and the synchronization apparatus.

FIG. 3 shows an exemplary embodiment of a sequence control register that can be used, for example, for power delay profile estimation. The sequence control register has the bit field C, M, BCS_HCHIP, BCS_SLOT, SYMB_NUM and SF. The bit fields C occupies the bit 0 and is a change bit which indicates that the parameters for the associated task have been programmed. The task sequence controller has to sample the change bit during each clock cycle, in order to determine what task must be controlled in time. If the change bit C is activated ("1"), the task sequence controller knows that a new task has been programmed by the DSP, and the task that is defined by other parameters or by the bit field should be initiated. If the change bit C is deactivated ("0"), then nothing is changed. At the start of a task, the hardware resets the change bit C, that is to say it deactivates it, in order to allow the DSP to program a new task.

The bit field M occupies bit 1, and indicates the task mode. Depending on the value in the bit field M, the hardware either has to start a task or end a task. If the bit is activated ("1"), then the task is started on the basis of other time parameters, and this corresponds to the task start TS task mode. If the bit is deactivated ("0"), then the task is ended immediately, which corresponds to the task cancel TC task mode, or is ignored if the task has not yet been started. The bit is deactivated, for example, when the task has been started and is currently being carried out and the DSP decides to cancel the task in order, for example, to start a newly programmed task. The cancelled task is not resumed.

The begin count start BCS in this exemplary embodiment is subdivided into the bit field BCS_HCHIP and the bit field BCS_SLOT. The bit field BCS_HCHIP is programmed by the DSP, occupies the bits 2 to 14 (13 bits) and defines the begin count stamp BCS in half chips. The programmed task is intended to be started by this time stamp. BCS_HCHIP is an integer value which defines a half-chip index over a time slot, that is to say 0, 1, . . . , 5119, and is based on the reference time which is specified by the timer. The bit field BCS_SLOT occupies the bits 15 to 18 (4 bits) and defines a time slot number. The BCS_HCHIP defines an integer modulo-5120, while BCS_SLOT denotes the time slot number, in order to clearly determine a time within a time frame. The value in the bit field BCS_SLOT is likewise based on the reference time, which is supplied by the timer.

The bit field SYMB_NUM occupies the bits 19 to 26 and replaces the end count stamp ECS. The value in the bit field SYMB_NUM indicates the number of chips or, in the case of the physical channel CPICH, the number of symbols, which each have 256 chips, which are used for a task starting with the begin count stamp BCS. The value in the bit field SYMB_NUM specifies which of the 150 symbols of the physical channel CPICH will be used to end the power delay profile estimation. The symbol number is based on the time control of the physical channel CPICH for the base station under consideration. The offset is an integer between 0 and 149, since the power delay profile estimation is always aligned with the CPICH symbols.

The bit field SF occupies the bits 27 to 29 and specifies the spreading factor (SF) for a task. In the illustrated exemplary embodiment of the sequence control register which is based on the physical channel CPICH, SF is always set to "110". The spreading factor is thus fixed at 256. The sequences 000, 001, 010, 011, 100, 101, 110 and 111 define the spreading factors 4, 8, 16, 32, 64, 128, 256 and 512.

As already mentioned, the counter in the synchronization apparatus preferably has two counters, with the first counter counting the number of chips within one time slot, and being a modulo-5120 counter with an over-sampling factor of 2, or a half-chip counter, and the second counter counting the number of time slots within one time frame. Whenever the count of the first counter is equal to the count in the bit field BCS_HCHIP, the count of the second counter is equal to the count in the bit field BCS_SLOT, and the bits C and M (TS) are activated, then the processing of the task is started with the first half chip of the BCS_HCHIP_Index.

The task of power delay profile estimation can be controlled in time for different cells, that is to say both intrafrequency cells and interfrequency cells. The relative time control (timing) of all the cells is not mutually synchronized. Each cell may have a different time frame offset with respect to the reference time for the mobile station. Each time frame offset is determined by the synchronization apparatus by means of the time slot and time frame synchronization processes described above, and is thus known to the DSP.

FIG. 4 shows the time control (timing) for power delay profile estimation for cells with a different time frame offset with respect to the reference time in the mobile station. The physical channels CPICH/SCH are used to show that the three cells 1, 2 and 3 each have a different time frame offset, and are thus controlled differently in time. The lowermost time axis shows the time control for the delay estimation device, which is based on the time control from the mobile station. The power delay profile estimations (tasks) DP1, DP2 and DP3 for the cells 1, 2 and 3 are programmed by the digital signal processor DSP into a sequence control register as shown in FIGS. 1 and 3, preferably approximately one time slot before the start of a task. The respective tasks DP1, DP2 and DP3 are associated with a respective begin count stamp BCS1, BCS2 and BCS3, which marks the start of the respective task. Owing to the end chips (tail chips), which are required for identification of the BCS and ECS via correlation processes, the DSP has to ensure that the BCSs of two successive tasks are separated by at least 128 chips.

The respective time frame offset for a task is kept transparent for the delay estimation device. The gap in a compressed mode is likewise transparent for the delay estimation device. The DSP knows the gaps in the compressed mode and controls the timing of the tasks such that they are not interrupted by the gaps, since the task sequence controller cannot resume a cancelled task. If a task for an interfrequency cell is intended to be carried out in the gap in the compressed mode, the DSP must control it in time such that it is located entirely within the gap. The DSP sets the bit field and the begin count stamp BCS such that the calculation with the pilot symbol of the CPICH is aligned with respect to the time control of the time frames for the base station under consideration. The number of the last CPICH pilot symbol is indicated for the calculation by SYMB_NUM in the respective sequence control register.

The invention claimed is:

1. An apparatus for time control of the processing of a radio signal in a synchronization apparatus in a mobile station in a mobile radio system, which has base stations and mobile stations, with the radio signal being transmitted from a base station, being subdivided into time frames with a predetermined number of chips, and having a specific time frame offset with respect to a reference time in the mobile station, the synchronization apparatus comprising:

a counter configured to count chips in the radio signal and to produce a count, wherein the counter is synchronized to the reference time in the mobile station; and a controller configured to control the processing of a task associated with the radio signal, wherein the controller activates the processing of the task when the count matches a start count, wherein the start count is determined as a function of the time frame offset of the radio signal with respect to the reference time in the mobile station, wherein the controller is further configured to control the processing of the task as a function of a further parameter that during the processing indicates a termination count, and wherein the further parameter further comprises one or more of a hold count and a resumption count, wherein a hold count results in a postponement of an already initiated task, and a resumption count resumes a task that has been postponed by a hold count.

2. The apparatus according to claim 1, wherein the synchronization apparatus further comprises at least one register or one memory for storage of the start count, and of the further parameter.

3. The apparatus according to claim 1, wherein in order to count chips in the radio signal, the counter comprises a first counter for counting sampled or over-sampled chips within a time slot, and a second counter for counting time slots within a time frame.

4. The apparatus according to claim 3, wherein the start count and the termination count respectively define a specific time slot in a time frame, and a chip in the specific time slot.

5. The apparatus according to claim 3, wherein the first counter has an over-sampling factor associated therewith that is designed in accordance with a system definition.

6. The apparatus according to claim 5, wherein the first counter comprises a modulo-N1 counter, and the second counter comprises a modulo-N2 counter, where N1 corresponds to the number of sampled or over-sampled chips per time slot, and N2 corresponds to the number of time slots per time frame.

7. The apparatus according to claim 1, wherein a digital signal processor in the mobile station is configured to calculate the start count and the further parameter as a function of the time frame offset of the radio signal with respect to the reference time.

8. The apparatus according to claim 1, wherein a timer in the mobile station is configured to produce the reference time for the mobile station.

9. A method for time control of the processing of a radio signal in a mobile station in a mobile radio system, which has base stations and mobile stations, with the radio signal being transmitted by a base station, being subdivided into time frames with a predetermined number of chips, and having a specific time frame offset with respect to a reference time in the mobile station, comprising:

counting sampled or oversampled chips in the radio signal, synchronized to the reference time in the mobile station to produce a count;

determining a start count as a function of the time frame offset of the radio signal with respect to the reference time in the mobile station; and controlling a processing of a task associated with the radio signal, such that the processing of the task is activated when the count matches the start count, and wherein controlling the processing of the task further comprises controlling the task with a further parameter that during the processing controls a termination count, wherein controlling the processing of the task further comprises controlling the task with the further parameter that controls one or more of a hold count and a resumption count, wherein a hold count results in a postponement of an already initiated task, and a resumption count resumes a task that has been postponed by a hold count.

* * * * *

UNITED STATES PATENT AND TRADEMARK OFFICE
CERTIFICATE OF CORRECTION

PATENT NO. : 7,630,730 B2  Page 1 of 1
APPLICATION NO. : 10/858818
DATED : December 8, 2009
INVENTOR(S) : Burkhard Becker et al.

It is certified that error appears in the above-identified patent and that said Letters Patent is hereby corrected as shown below:

Column 16, Claim 6, Line 28: Please replace the number "5" with --3--

Signed and Sealed this

Nineteenth Day of January, 2010

David J. Kappos
*Director of the United States Patent and Trademark Office*